United States Patent
Weigand et al.

(10) Patent No.: US 9,663,049 B2
(45) Date of Patent: May 30, 2017

(54) COVER DEVICE FOR AN OPENING IN A CAR BUMPER USED AS A PASSAGE FOR A TRAILER HITCH

(71) Applicant: GM GLOBAL TECHNOLOGY OPERATIONS LLC, Detroit, MI (US)

(72) Inventors: Achim Weigand, Bad Soden am Taunus (DE); Torsten Radusch, Wiesbaden (DE); Frank Schweikhard, Gau-Algesheim (DE); Roland Seewald, Ginsheim-Gustavsburg (DE); Raffael Urzola, Emmendingen (DE); Waldemar Appelhans, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/974,145

(22) Filed: Dec. 18, 2015

(65) Prior Publication Data
US 2016/0176373 A1    Jun. 23, 2016

(30) Foreign Application Priority Data

Dec. 20, 2014    (DE) .................... 20 2014 010 120 U

(51) Int. Cl.
*B60R 19/02* (2006.01)
*B60R 19/48* (2006.01)
*B60D 1/60* (2006.01)

(52) U.S. Cl.
CPC .............. *B60R 19/023* (2013.01); *B60D 1/60* (2013.01); *B60R 19/48* (2013.01)

(58) Field of Classification Search
CPC .......... B60R 19/023; B60R 19/48; B60D 1/60
USPC .................... 296/191, 37.1; 293/106, 117
See application file for complete search history.

(56) References Cited

U.S. PATENT DOCUMENTS

| | | | | |
|---|---|---|---|---|
| 5,628,536 A | * | 5/1997 | Fulkerson | B60D 1/54 280/507 |
| D468,674 S | | 1/2003 | Laster et al. | |
| 6,581,955 B2 | * | 6/2003 | Aquinto | B60D 1/485 280/491.5 |
| 6,830,274 B2 | * | 12/2004 | Burkhardt | B60R 13/02 280/507 |
| 8,191,942 B2 | | 6/2012 | Hope | |
| 8,480,142 B2 | * | 7/2013 | Wuerfel | B60R 19/483 293/117 |
| 2004/0104557 A1 | * | 6/2004 | Kaepp | B60D 1/485 280/495 |

(Continued)

FOREIGN PATENT DOCUMENTS

| | | |
|---|---|---|
| DE | 4342981 A1 | 7/1994 |
| DE | 10235184 A1 | 2/2004 |

(Continued)

OTHER PUBLICATIONS

German Patent Office, German Search Report for German Application No. 202014010120.5, dated Oct. 9, 2015.

*Primary Examiner* — Jason S Morrow
(74) *Attorney, Agent, or Firm* — Lorenz & Kopf LLP

(57) ABSTRACT

A cover device for covering an opening in a bumper for a motor vehicle is provided, which can be used as a passage for a detachable trailer hitch component, features a frame that forms an opening and a cover part to cover the opening of the frame.

10 Claims, 15 Drawing Sheets

(56) References Cited

U.S. PATENT DOCUMENTS

| | | | | |
|---|---|---|---|---|
| 2004/0232653 A1* | 11/2004 | Kaepp | ................... | B60D 1/485 |
| | | | | 280/500 |
| 2009/0039618 A1* | 2/2009 | Takemura | ................ | B60D 1/60 |
| | | | | 280/507 |
| 2011/0088228 A1* | 4/2011 | Mineshima | ........... | B60R 19/023 |
| | | | | 24/682.1 |
| 2011/0304168 A1* | 12/2011 | Muller | ................. | B60R 19/023 |
| | | | | 296/1.08 |
| 2016/0031490 A1* | 2/2016 | Lawrence | ............... | B60R 5/044 |
| | | | | 296/191 |

FOREIGN PATENT DOCUMENTS

| | | |
|---|---|---|
| DE | 102004012153 A1 | 10/2005 |
| DE | 102012014176 A1 | 1/2014 |
| EP | 0969171 A2 | 1/2000 |
| EP | 1512582 A1 | 3/2005 |
| EP | 2712768 A1 | 4/2014 |

\* cited by examiner

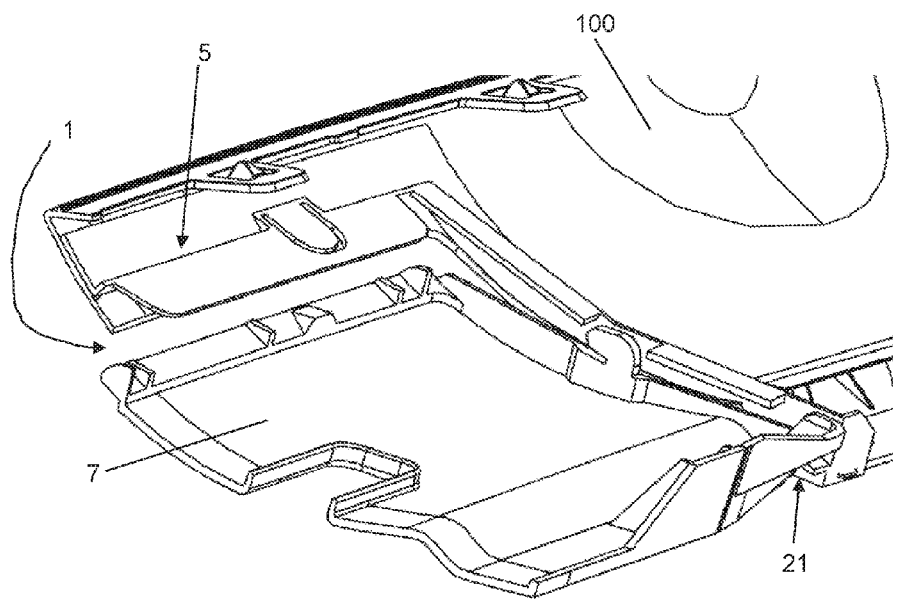
Fig. 6.1
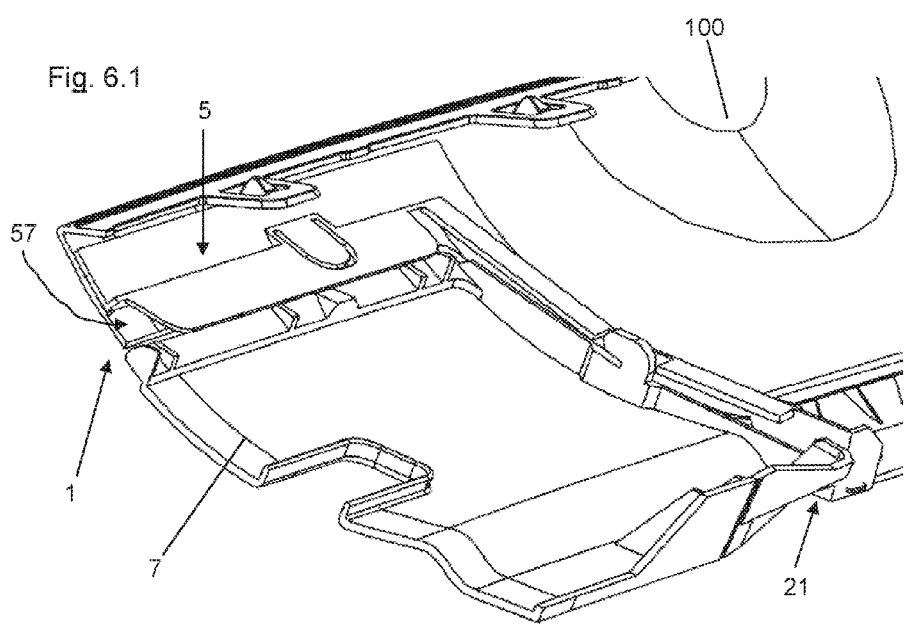
Fig. 6.2

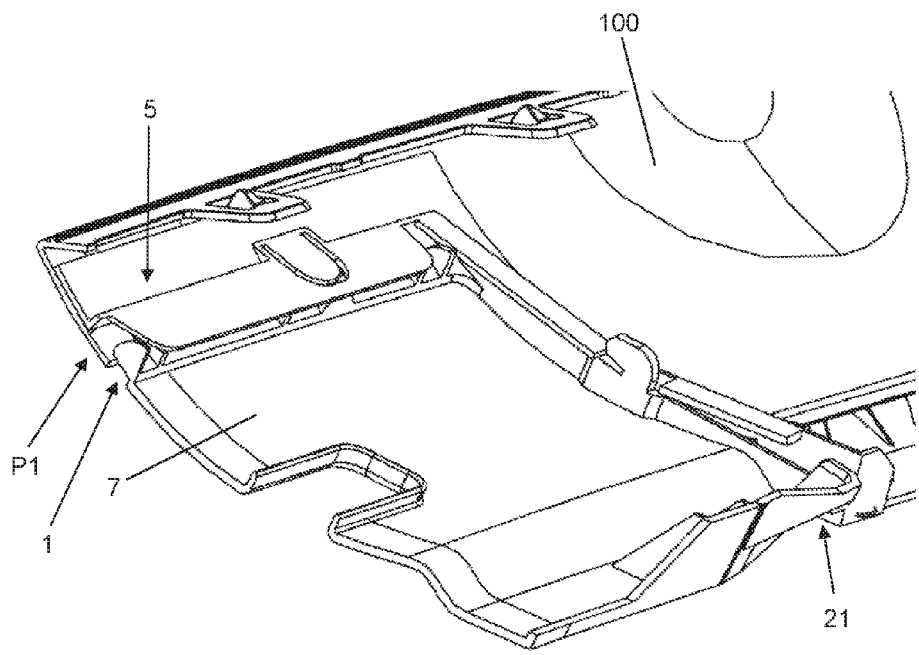
Fig. 6.3
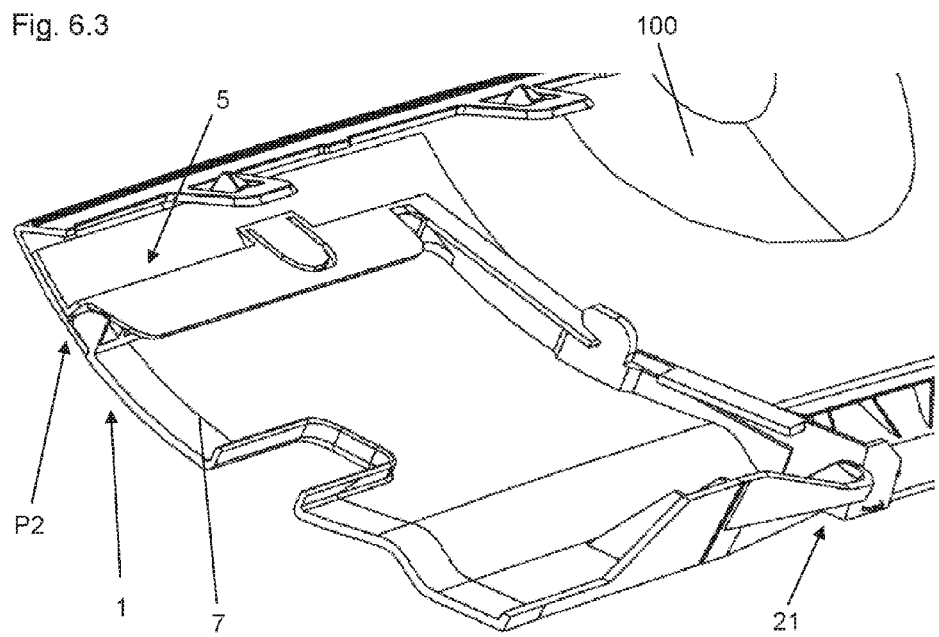
Fig. 6.4

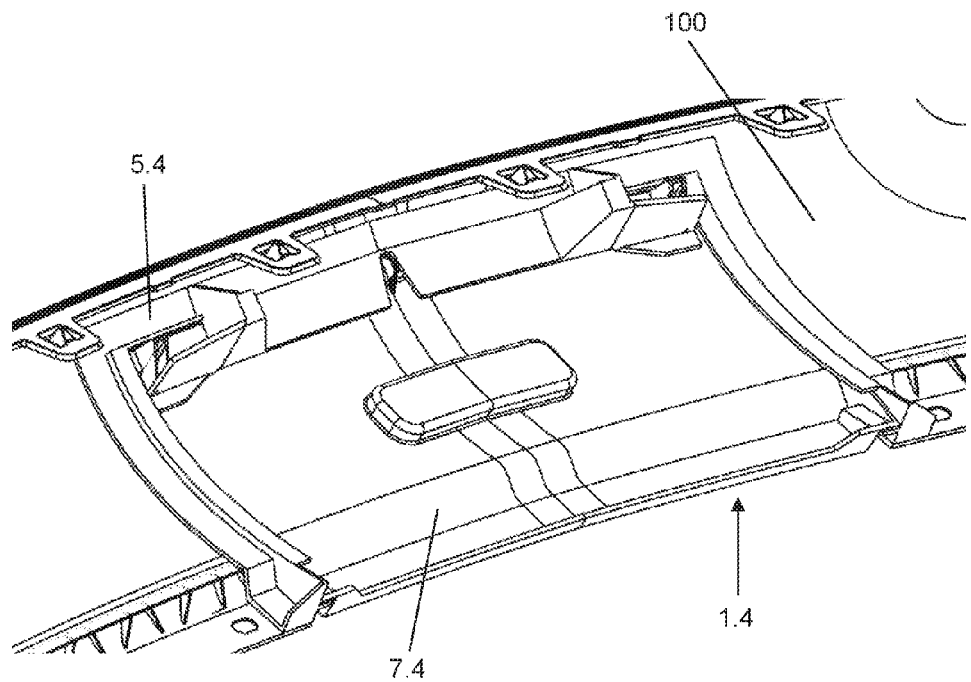
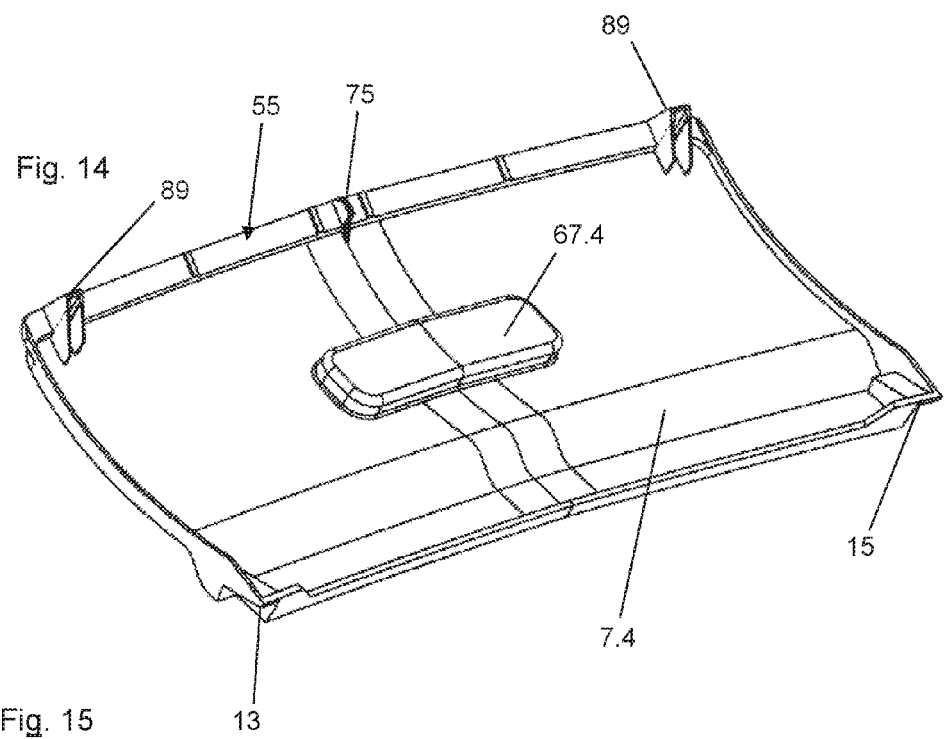
Fig. 14
Fig. 15

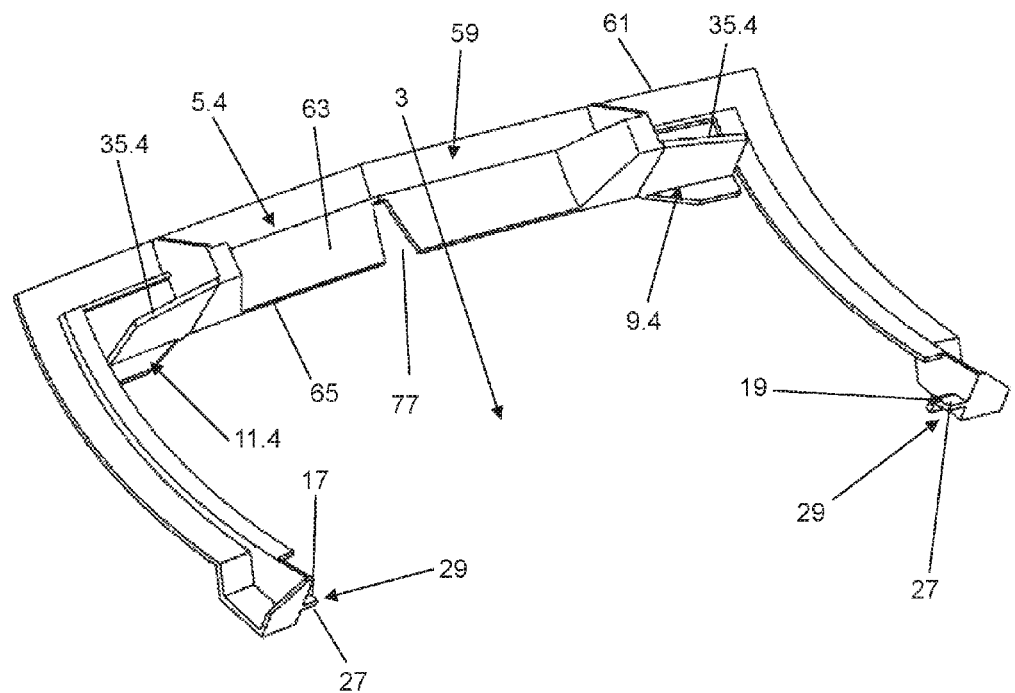
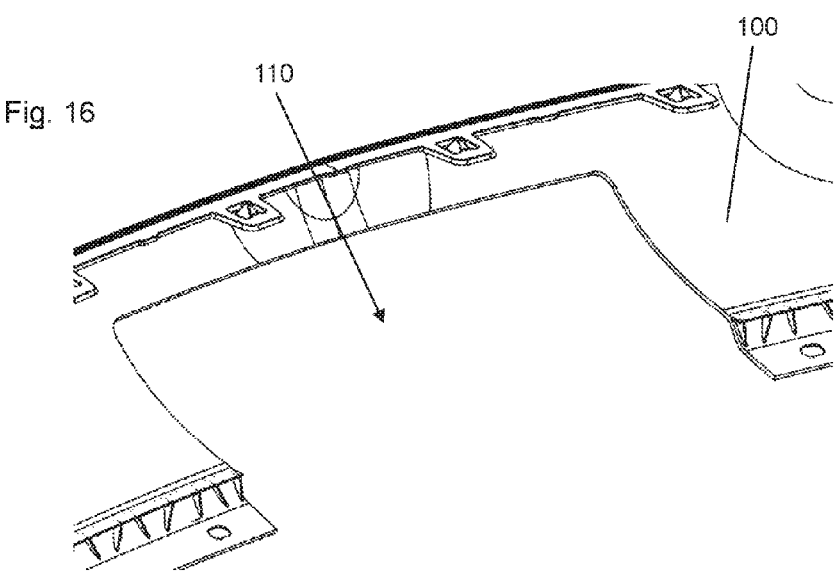
Fig. 16
Fig. 17

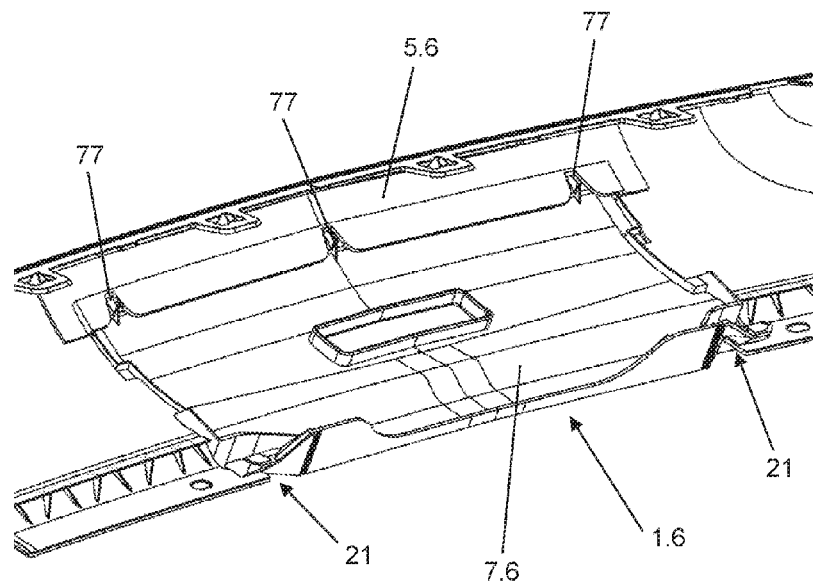
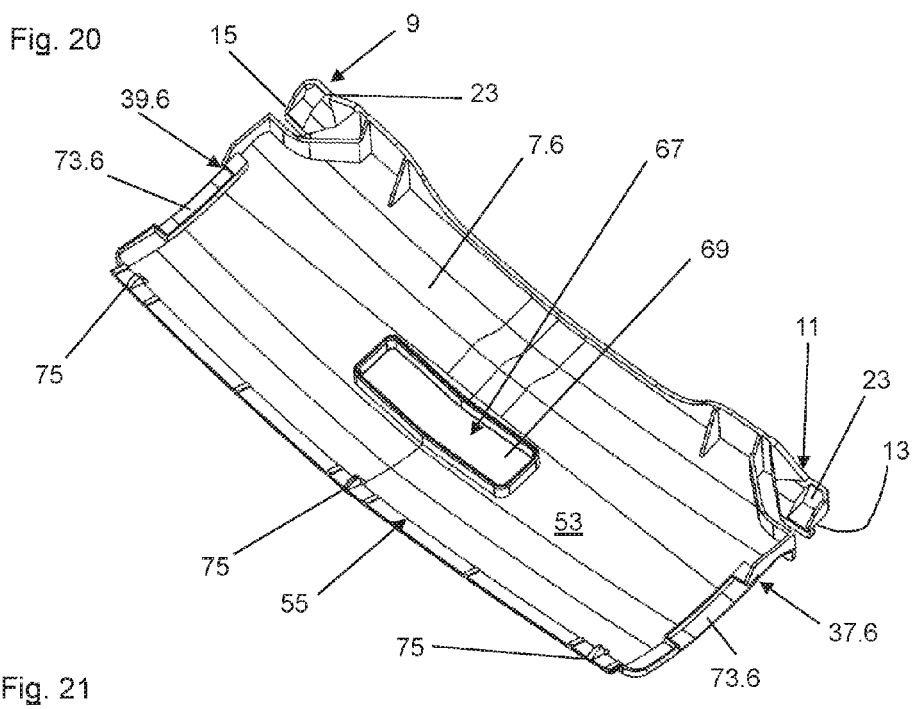

COVER DEVICE FOR AN OPENING IN A CAR BUMPER USED AS A PASSAGE FOR A TRAILER HITCH

CROSS-REFERENCE TO RELATED APPLICATION

This application claims priority to German Patent Application No. 202014010120.5, filed Dec. 20, 2014, which is incorporated herein by reference in its entirety.

TECHNICAL FIELD

The present disclosure pertains to a cover device for covering an opening in a bumper for a motor vehicle, which can be used as a passage for a detachable trailer hitch component.

BACKGROUND

Modern motor vehicles increasingly feature trailer hitch components that can be detachably installed on the frame of the motor vehicle. For this purpose, the rear bumper of the motor vehicle usually features an opening that serves as a passage for the trailer hitch component. The opening is ordinarily closed with a cover.

An herein described embodiment of the invention provides a cover device of the initially cited type, which allows a user to close an opening in a bumper, through which a trailer hitch component or another attachment can be inserted, in a technically easily manageable fashion.

SUMMARY

According to a herein described embodiment of the invention, a cover device for covering an opening in a bumper for a motor vehicle, which can be used as a passage for a detachable trailer hitch component, features a frame that forms an opening and a cover part to cover the opening of the frame.

In the cover device, the cover part can be installed on the frame in such a way that the cover part is moved from an initial position into an intermediate installation position against the force of at least one spring element and the force of the spring element subsequently moves the cover part into a final installation position or promotes the movement of the cover part into a final installation position, wherein the opening of the frame is in the final installation position covered by the cover part.

The cover device makes it possible to at least partially or completely cover the opening formed by the frame. To this end, a user merely has to move the cover part into the intermediate installation position. Due to the restoring force of the spring element generated in the intermediate installation position, the cover part is then moved into the final installation position, particularly displaced into the final installation position, automatically or at least in a force-assisted fashion. In this respect, the force or restoring force of the at least one spring element ultimately simplifies the installation of the cover part on the frame for a user.

The above-described advantages with respect to the installation of the cover part are achieved analogously if the cover device is installed on a bumper for a motor vehicle and the opening formed by the frame is used, for example, as a passage for a detachable trailer hitch component.

It would be possible that the cover part is detached from the frame in the initial position, for example located spatially separate of the frame. The cover part may be removed from the frame in the initial position.

It is advantageous that the restoring force of the spring element is only generated during the course of the installation of the cover part from the initial position into the intermediate installation position. This means that the spring element is relaxed in the initial position of the cover part. In this way, the service life of the spring element is improved. It is thereby simultaneously prevented that the spring element inadvertently and uncontrollably snaps back due to an existing preload. Naturally, the spring element also may, in principle, already be preloaded in the initial position or in a position other than the intermediate installation position. It is anticipated that the at least one spring element is during the installation of the cover part from the initial position into the intermediate installation position tensioned to such a degree that the force of the spring element moves the cover part into the final installation position or at least promotes the movement of the cover part into the final installation position.

It is advantageous if the spring element is dimensioned in such a way that the force of the spring element holds the cover part in the final installation position. A permanent cover of the frame opening is thereby ensured in a technically simple fashion. In addition, the force of the spring element also prevents any rattling of the cover part against the frame.

It would be possible that the spring element is arranged on the cover part, particularly realized thereon. In this way, the spring element is removed together with the cover part, for example, when the cover part is in the initial position. The spring element is thereby prevented, for example, from loosely and movably remaining on the frame that may be mounted on a bumper of a motor vehicle. In this respect, a spring element located thereon would be bothersome and could be easily lost.

In contrast, it would basically also be possible that the spring element is arranged on the frame, particularly realized thereon. Depending on the design, this may provide certain advantages with respect to the manufacture, for example, if the spring element is integrally molded on the frame.

According to a potential embodiment of the invention, the spring element is formed by a material section that can be elastically moved at least in the direction of the movement of the cover part from the intermediate installation position into the final installation position. The spring element is thereby realized in a technically simple fashion. For example, the material section is integrally molded or formed on the cover part or the frame.

According to another herein described embodiment of the invention, it is proposed that the cover part features at least one bearing surface that can be coupled with a counter-bearing surface of the frame such that a pivot bearing is formed and the cover part can be pivoted into the intermediate installation position relative to the frame. Due to this measure, a simple installation of the cover part is achieved. In this case, the cover part merely has to be placed against the counter-bearing surface of the frame and can then be pivoted into the intermediate installation position. The counter-bearing surface on the frame defines a stop on the frame, at which the cover part already is at least with a section or with one side moved into a defined position.

For example, the bearing surface is formed by a curved wall or an angled wall or a curved or angled wall section such as, for example, a depression of the cover part and the counter-bearing surface is formed by an essentially corresponding wall section of a projection of the frame. For example, the projection laterally protrudes into the opening of the frame. Such an embodiment is advantageous if the frame is realized open on one side such as, for example, in an essentially U-shaped fashion, in which case the projection points inward in the direction of the opening on the open end of the frame.

According to another herein described embodiment of the invention, a stable and durable pivot bearing is formed if the cover part respectively features a wall section with such a bearing surface on two opposite sides, for example, in an end region thereof. In this way, two bearing surfaces are realized on the cover part and can be coupled to corresponding counter-bearing surfaces on the frame in order to form the pivot bearing.

It is furthermore advantageous if the bearing surface or the counter-bearing surface is arranged on the spring element. In this way, contact between the cover part and the frame is also maintained when the cover part is moved from the intermediate installation position into the final installation position. The cover part is thereby at least in the region of the contacting bearing surfaces moved into a defined position relative to the frame such that the positioning of the cover part relative to the frame is already realized.

It is advantageous if the cover part is displaced relative to the frame in order to be transferred from the intermediate installation position into the final installation position. For example, side parts of the frame serve as guides, particularly sideways, on which the cover part is guided, for example, with its lateral ends during the displacement from the intermediate installation position into the final installation position.

According to another potential embodiment of the invention, at least one snap-on element is provided and engages with a snap-on counterelement during the movement of the cover part from the intermediate installation position into the final installation position such that the cover part is in the final installation position secured against separating from the frame at least in the direction extending transverse to the covering surface of the cover part. It is thereby ensured that the cover part is retained in the final installation permanently and securely held on the frame and the cover part also remains securely held on the frame under the influence of disturbing external forces. Due to the snap-on element, the cover part is interlocked with the frame part and therefore can no longer be removed in the direction extending transverse to the covering surface of the cover part. For example, the snap-on element is arranged on the cover part, in particular integrally molded on the cover part. In this respect, the snap-on counterelement is arranged on the frame, in particular integrally molded on the frame.

It is advantageous if the snap-on element is arranged on the cover part in such a way that the snap-on element is during the movement of the cover part from the initial position into the intermediate installation position moved relative to the snap-on counterelement into a pre-engagement position, wherein the snap-on element is then engaged with the snap-on counterelement due to the movement of the cover part from the intermediate installation position into the final installation position, for example, by displacing the cover part relative to the frame. In this way, the installation movement is simultaneously used for realizing the engagement between the snap-on element and the snap-on counterelement. The installation effort is thereby reduced. The installation is also simplified for the user in that threading of the snap-on element relative to the snap-on counterelement is prevented. Due to the movement of the cover part into the intermediate installation position, the snap-on element already is in a defined position relative to the snap-on counterelement in order to be subsequently engaged therewith by moving the cover part into the final installation position.

According to another embodiment of the invention, it is proposed that the cover part is pushed into a receptacle with an end region, particularly a front end region or front end, due to the movement from the intermediate installation position into the final installation position, wherein said receptacle is formed by a section of the frame or by the frame and a peripheral section of an opening in a bumper such that the cover part is in the end region secured against separating from the frame at least in the direction extending transverse to the covering surface of the cover part. In this way, the cover part is locked relative to the frame in the one end region, particularly the front end region of the cover part, in a technically simple fashion. It is thereby ensured that the cover part security remains in the predefined position in the final installation position. The cover part is thereby also prevented from inadvertently protruding outward from the frame.

According to another embodiment of the invention, it would be possible that at least one outwardly protruding projection is arranged, in particular integrally formed, on the end region of the cover part, particularly the front end region or the front end, wherein said projection is in the final installation position inserted into a receptacle such as, for example, a slot such that the cover part is in the end region secured against a lateral displacement relative to the frame. This measure serves for securely and immovably holding the cover part on the frame in the final installation position by realizing a positive restraint or an additional positive restraint by means of the projection and the receptacle.

According to another embodiment of the invention, a cover device for covering an opening in a bumper for a motor vehicle, which can be used as a passage for a detachable trailer hitch component, features a frame that forms an opening and a cover part to cover the opening of the frame. The cover part may consist of a cover part of the above-described type. The frame may also consist of a frame of the above-described type.

It is proposed that the cover part features at least one bearing surface that can be coupled with a counter-bearing surface of the frame such that a pivot bearing is formed and the cover part can be pivoted from an initial position into a final installation position relative to the frame, wherein at least one spring element is provided and the cover part is moved into the final installation position against the force of the spring element and held in the final installation position by the force of the spring element. The initial position may be the above-described initial position. The final installation position may also be the above-described final installation position.

In this way, the installation of the cover part on the frame can be realized in a technically simple fashion. To this end, a user merely has to place the counter-bearing surface of the frame against the bearing surface of the cover part and then pivot the cover part, wherein the spring element builds up a restoring force during the course of the pivoting movement and the cover part is held in the final installation position by this restoring force. This also provides the user with the advantage that the cover part can be completely removed from the frame and therefore securely carried along, for example, in the passenger compartment of a vehicle without the risk of being lost as long as the opening is used as a passage for a trailer hitch component or another attachment.

According to an embodiment of the invention, the frame may feature a contact surface for being connected to a bumper for a motor vehicle and a contact surface for the cover part, wherein the contact surfaces are offset relative to one another in such a way that the outer side of the cover part is in the final installation position essentially flush with the outer side of the bumper when the frame contacts the inner side of the bumper. In this way, an appealing external appearance is achieved, in which the cover part is largely inconspicuous. The cover part can be locked relative to the frame by means of the snap-on elements or projections or similar interlocking elements such that the cover part is in the final installation position on the frame secured against moving transverse to the covering surface of the cover part.

According to another embodiment of the invention, the cover part may feature a manipulating element for the manual installation of the cover part. The manipulating element may be formed, for example, by a through-opening or depression that is as wide as a finger or by at least two depressions that can be taken hold of with fingers. In this way, the installation is simplified for the user of the cover part because the manipulating element makes it possible to optimally take hold of and subsequently install the cover part on the frame.

According to another embodiment of the invention, the frame is at least partially formed by the periphery of an opening in a bumper for a motor vehicle. In this way, the cover device is realized with relatively little material input because a separate frame is not required or at least only required for a region of the cover part.

Alternatively, it would naturally also be possible that the frame is formed by a separate component. In this case, the cover device has a high flexibility. The cover device can then be connected to arbitrary bumpers for a motor vehicle.

Embodiments of the invention furthermore may be a bumper for a motor vehicle with an opening, to which the above-described cover device or a cover device of the above-described type is attached.

Embodiments of the invention also may be a motor vehicle with the above-described cover device or a cover device of the above-described type.

BRIEF DESCRIPTION OF THE DRAWINGS

The present invention will hereinafter be described in conjunction with the following drawing figures, wherein like numerals denote like elements.

FIG. 14 shows a fourth embodiment of a cover device that is installed on a bumper for a motor vehicle in the form of a perspective view, FIG. 15 shows the cover part of the cover device according to FIG. 14 in the form of a perspective view, FIG. 16 shows the frame of the cover device according to FIG. 14 in the form of a perspective view.

FIG. 17 shows a detail of the bumper according to FIG. 14 in the region of an opening for the cover device according to FIG. 14.

FIG. 20 shows a sixth embodiment of a cover device that is installed on a bumper for a motor vehicle in the form of a perspective detail, FIG. 21 shows the cover part of the cover device according to FIG. 20 in the form of a perspective view.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
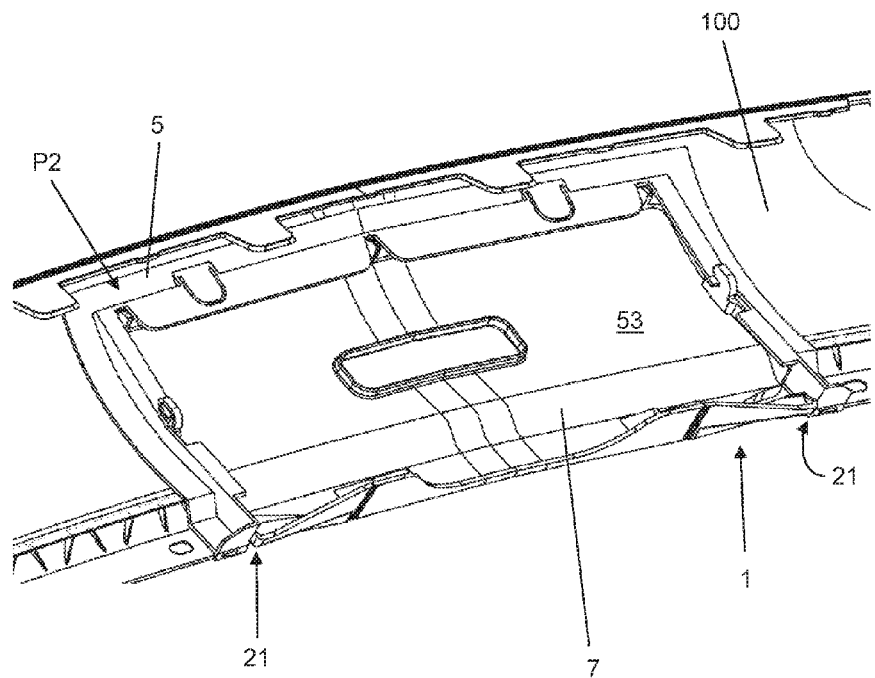
FIG. 1 shows a first embodiment of a cover device that is installed on a bumper for a motor vehicle in the form of a perspective detail.
Figure 2:
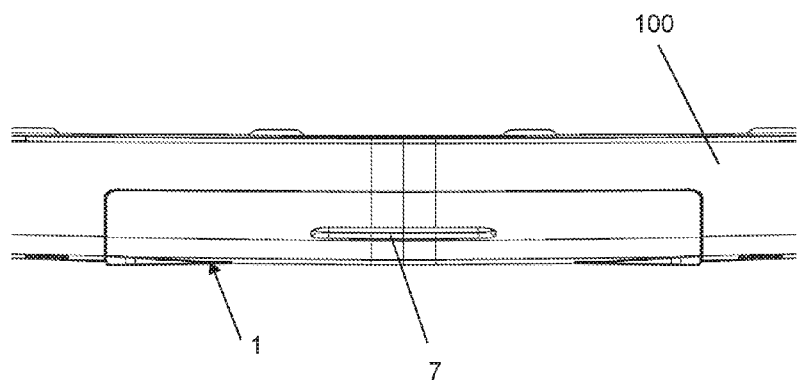
FIG. 2 shows the cover device and the bumper according to FIG. 1 in the form of a partial bottom view.

FIG. 1 shows a potential embodiment of a cover device 1 for covering an opening in a bumper for a motor vehicle, which can be used as a passage for a detachable trailer hitch component or another attachment. In this case, the cover device 1 is already installed on a bumper 100. FIG. 2 shows the bumper 100 together with the cover device 1 in the form of a bottom view.

Figure 3:
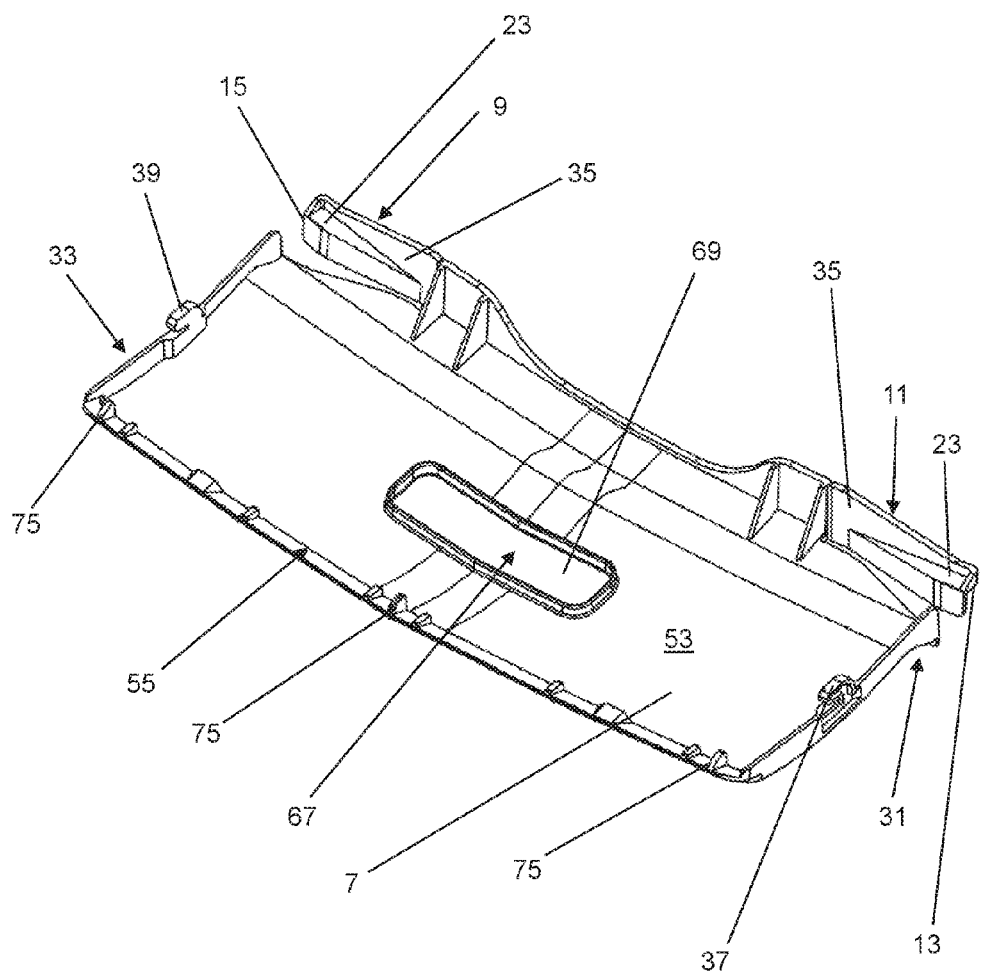
FIG. 3 shows the cover part of the cover device according to FIG. 1 in the form of a perspective view.
Figure 4:
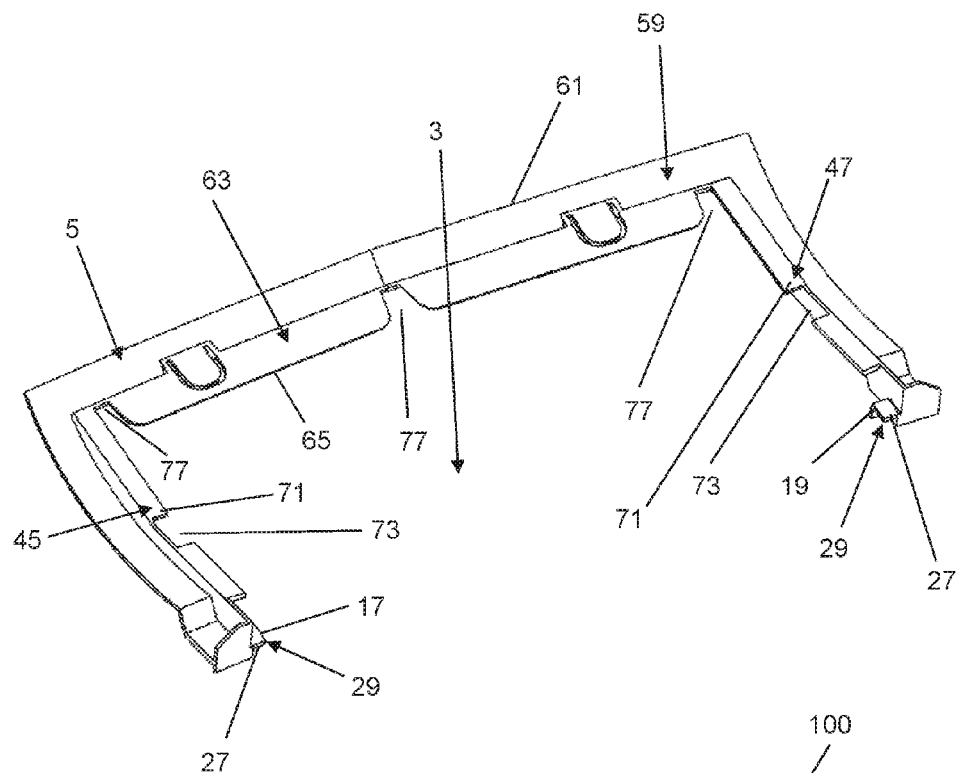
FIG. 4 shows the frame of the cover device according to FIG. 1 in the form of a perspective view.
Figure 5:
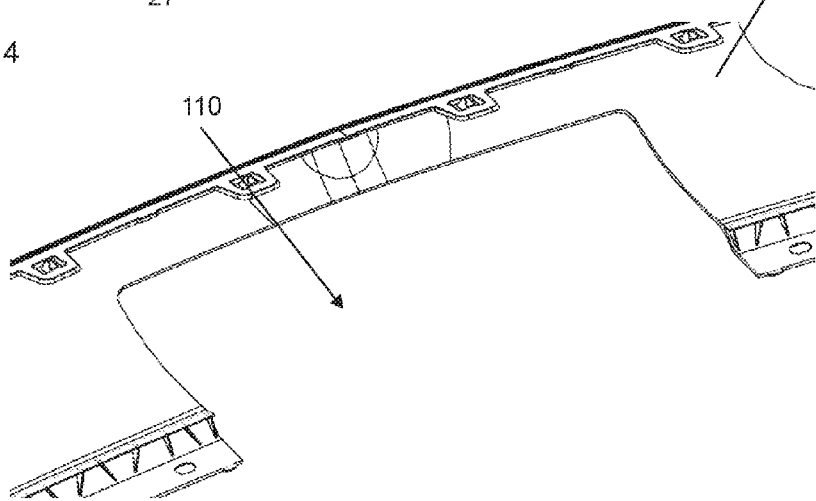
FIG. 5 shows a detail of the bumper according to FIG. 1 in the region of an opening for the installation of the cover device according to FIG. 1, FIGS. 6.1-6.4 respectively show different positions of the cover part relative to the frame of the cover device according to FIG. 1 during the installation of the cover part in the form of sectioned perspective views.

The cover device 1 features a frame 5 that forms an opening 3 and a cover part 7 for covering the opening 3. It is preferred that the cover part 7 and the frame 5 are respectively formed by at least one plastic part. FIG. 3 shows the cover part 7. FIG. 4 shows the frame 5. FIG. 5 shows the bumper 100 in the region of an opening 110, which can be used as a passage for a detachable trailer hitch component or another attachment (that is not illustrated in FIG. 5).

The frame 5 of the cover device 1 preferably has such dimensions that it can be attached, for example bonded and/or welded, to the periphery of the opening 110 in the bumper 100. For this purpose, the frame 5 preferably features a periphery 59 with a contact surface 61. The periphery 59 is preferably dimensioned in such a way that it at least partially covers the periphery of the opening 110 in the bumper 100, wherein the contact surface 61 is placed against the periphery of the opening 110 and the frame 5 can then be connected to the bumper 100, for example by means of welding and/or bonding, at the contact surface 61.

According to FIGS. 4 and 5, the opening 110 in the bumper 100 may be realized such that it is laterally open toward one side. For example, the opening 110 has the shape of the outer periphery of a U-shaped component. The frame 5 may accordingly be realized in a U-shaped fashion. The periphery 59 may be realized, for example, in the form of an essentially continuous U-shaped periphery.

The frame 5 preferably features another periphery 63 with a contact surface 65 for the cover part 7. The periphery 63 is preferably connected to the periphery 59, in particular integrally molded thereon. Referred to the periphery 59, the periphery 63 is preferably arranged inward in the direction toward the opening 3 of the frame 5. When the cover part 7 is installed on the frame 5, the cover part 7 preferably is in contact with the contact surface 65 of the periphery 63 in the closed state of the opening 3 of the frame 5. In order to realize the cover part 7 such that it ends flush with the outer side of the bumper 100 in this state, the contact surface 65 of the periphery 63 located opposite of the contact surface 61 of the periphery 59 may be respectively offset rearward or inward relative to the outer side of the bumper 100.

The cover part 7 is preferably realized plane and has an outer contour that at least partially corresponds to the outer contour of the bumper 100 in the region of the opening 110 to be closed. The cover part 7 preferably has such a surface area that it essentially or completely covers the opening 3 of the frame 5 and fits into the opening 3 such that the edge region of the cover part 7 at least partially contacts or adjoins the contact surface 65 of the periphery 63 of the frame 5 in the installed state of the cover part 7 on the frame 5.

The cover part 7 may feature a manipulating element 67 for the manual installation of the cover part 7 on the frame 5. For example, the manipulating element 67 is formed by a through-opening 69, into which a user can insert at least two fingers in order to take hold of and install the cover part 7 on the frame 5.

The cover part 7 can be removed from the frame 5. For example, the frame 5 is in the installed state of the cover device 1 mounted on the bumper 100 and the frame 5 then serves as carrier for the cover part 7 that is held on the frame 5 as and when required and covers the opening 3 of the frame 5, as well as the opening 110 in the bumper 100.

The cover part 7 preferably features at least one bearing surface, particularly two bearing surfaces 13 and 15, that can be respectively coupled to a counter-bearing surface 17 or 19 of the frame 5 such that a pivot bearing 21 is formed and the cover part 7 can be pivoted relative to the frame 5 from an initial position into an intermediate installation position. The bearing surfaces 13 and 15 may be respectively formed by a curved wall section 23 of the cover part 7 and the corresponding counter-bearing surface 17 or 19 may be formed by an at least partially corresponding wall section 27 of the frame 5. For example, the wall sections 27 are respectively realized on a projection 29 of the frame 5 that laterally protrudes into the opening 3 of the frame 5. The respective wall sections 23 preferably form part of a receptacle such as, for example, a depression 25. The bearing surfaces 13 and 15 are preferably arranged on two opposite sides 31 and 33 of the cover part 7.

The cover device 1 is preferably realized in such a way that the cover part 7 is moved from the initial position or an initial position into the intermediate installation position against the force of at least one spring element, particularly two spring elements 9 and 11, and the movement of the cover part 7 into a final installation position is subsequently promoted by the force of the spring elements 9 and 11 or the cover part 7 is moved into the final installation position by the force of the spring elements 9 and 11. The opening 3 of the frame 5 is covered in the final installation position. This final installation position is illustrated in FIG. 1. In this figure, the reference symbol P2 is assigned to the final installation position.

The spring elements 9 and 11 may be respectively formed by an elastically movable material section 35 of the cover part 7. For example, the respective material section 35 is integrally molded on the cover part 7. The respective material section 35 is preferably realized such that it can be elastically moved at least in the direction of the movement of the cover part 7 from the intermediate installation position into the final installation position P2. It is preferred to respectively arrange or realize one of the bearing surfaces 13 and 15 on the respective elastically movable material section 35.

The cover part 7 may feature at least one snap-on element, preferably at least two snap-one elements 37 and 39, that respectively engage with a snap-on counterelement 45 and 47 during the movement of the cover part 7 from the intermediate installation position into the final installation position P2 such that the cover part 7 is in the final installation position P2 secured against separating from the frame 5 in the direction extending transverse to the covering surface 53 of the cover part 7. The snap-on elements 37 and 39 may respectively feature a locking tab or be realized in the form of a locking tab. The snap-on counterelements 45 and 47 may be respectively formed by a wall section 71 or a similar stop of the frame 5. For example, the wall section 71 forms part of the periphery 63 of the frame 5 that serves as a support or contact surface for the cover part 7. In this case, an interruption 73 or opening is preferably provided in the periphery 63 such that the snap-on elements 37 and 39 of the cover part can be inserted and moved into a pre-engagement position through said interruption or opening during the course of the installation of the cover part 7.

The cover part 7 preferably features at least one outwardly extending projection or similar rib 75, particularly several such projections or ribs, which are, for example, integrally molded on the cover part 7. The projections or ribs 75 are in the final installation position P2 of the cover part 7 respectively inserted into a corresponding receptacle 77 of the frame 5, particularly a slot, such that the cover part 7 is secured against a lateral displacement relative to the frame 5 in the region of this connection.

The ribs 75 or projections may be arranged on the front end region 55 of the cover part 7 that lies opposite of the side of the cover part 7 realized in the form of a pivot bearing 21. In this way, the front end region 55 of the cover part 7 is in the final installation position P2 additionally secured against a lateral displacement on the frame 5.

FIGS. 6.1, 6.2, 6.3 and 6.4 show examples of several installation states during the installation of the cover part 7 on the frame 5 of the cover device 1, which is already mounted on the bumper 100 in this case. As already described above, the cover part 7 is starting from an initial position or the initial position (that is not illustrated in FIGS.

6.1-6.4) manually coupled by a user to the counter-bearing surfaces 17 and 19 of the frame 5 with its bearing surfaces 13 and 15 such that a pivot bearing 21 is formed. The coupled cover part 7 is illustrated in FIG. 6.1. Subsequently, the cover part 7 is pivoted by the user in the direction toward the frame 5 about the pivoting axis formed by the pivot bearing 21 until the cover part 7 contacts the frame 5, for example the periphery 63 of the frame 5. During the course of this pivoting movement, for example, the cover part 7 is positioned relative to the frame 5 by the user against the force of the spring elements 9 and 11 to such a degree that the lateral snap-on elements 37 and 39 extend through the interruptions 73. At this point, the cover part 7 is moved relative to the frame 15 into the intermediate installation position illustrated in FIG. 6.3. In this figure, the intermediate installation position is identified by the reference symbol P1.

The cover element 7, which is held by the user with the aid of the manipulating element 67 and in the intermediate installation position P1, in which it contacts the frame 5, is subsequently displaced forward, i.e. in the direction away from the pivot bearing point, by the force of the spring elements 9 and 11 only or with the assistance of the force of the spring elements 9 and 11, wherein the snap-on elements 37 and 39 are moved from their respective pre-engagement position into the engaged position with the snap-on counterelements 45 and 47 on the frame 5 and the ribs 75 of the cover part 7 are simultaneously inserted into the receptacles 77. The cover part is now in the final installation position P2 illustrated in FIG. 6.4.

In the final installation position P2, the front end region 55 of the cover part 7 may be inserted into a receptacle 57 that may be formed by the frame 5, particularly its periphery 63, and a peripheral section of the opening 110 in the bumper 100. In this way, the cover part 7 is in its front end region 55 additionally secured against separating from the frame 5 in the direction transverse to the covering surface 53 of the cover part 7.

Figure 7:
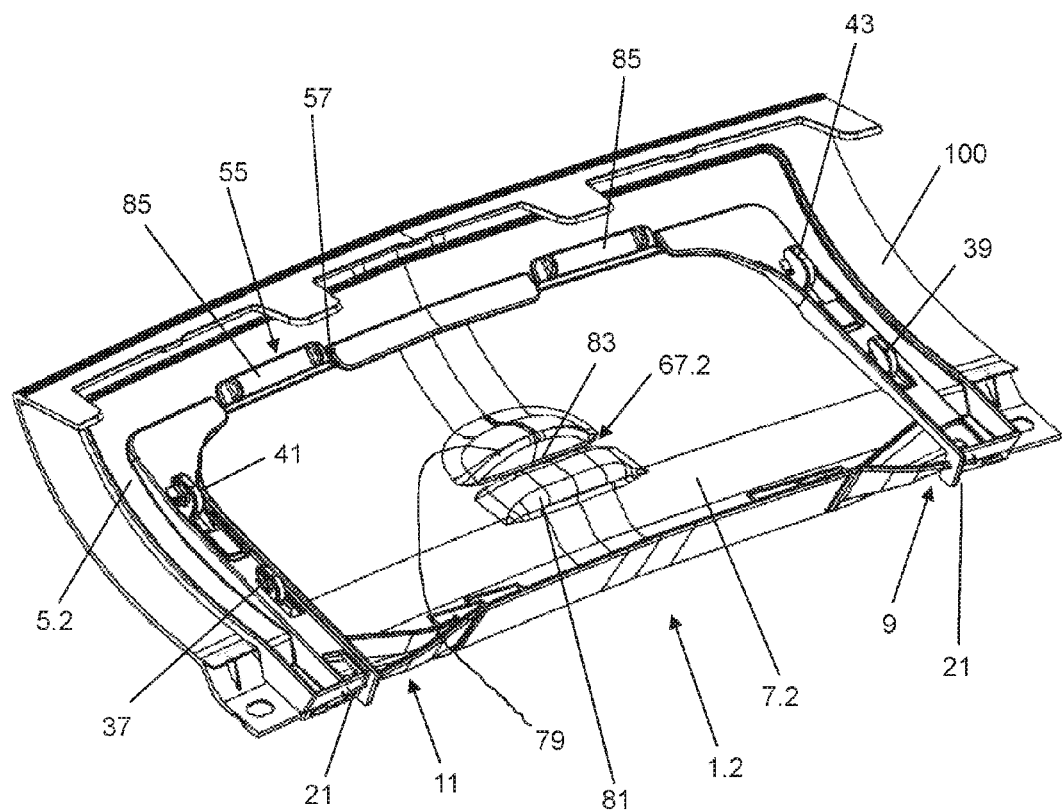
FIG. 7 shows a second potential embodiment of a cover device that is installed on a bumper for a motor vehicle in the form of a perspective detail.
Figure 8:
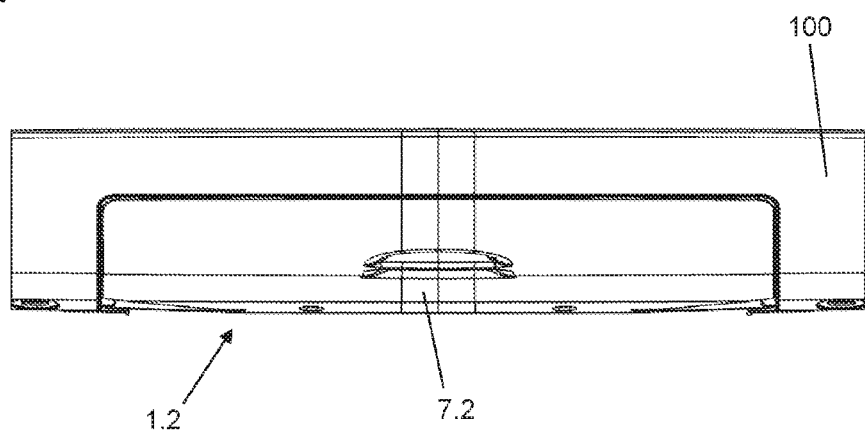
FIG. 8 shows the cover device according to FIG. 7 with the bumper in the form of a bottom view.

FIGS. 7 and 8 show a second embodiment of the cover device 1.2 for covering an opening in a bumper for a motor vehicle, which can be used as a passage for a detachable trailer hitch component, wherein the cover device 1.2 is already installed on the bumper 100. FIG. 7 shows the cover device 1.2 and the bumper 100 in the form of a perspective side view. FIG. 8 shows the cover device 1.2 together with the bumper 100 in the form of a bottom view.

Components and functional elements of the cover device 1.2 according to FIGS. 7 and 8, which are identical or functionally identical to components and functional elements of the cover device 1 according to FIGS. 1-6, are identified by the same reference symbols; in this respect, we refer to the description of the cover device 1 with reference to FIGS. 1-6.

The cover device 1.2 according to FIGS. 7 and 8 can be distinguished from the cover device 1 according to FIGS. 1-6, among other things, in that the frame 5.2 and the cover part 7.2 are modified in comparison with the frame 5 and the cover part 7 of the cover device 1 according to FIGS. 1-6.

The cover part or top part 7.2 features a manipulating element 67.2 for the manual installation of the cover part 7.2 on the frame 5.2, wherein said manipulating element is formed by two depressions 79 and 81 that can be taken hold of with fingers. The depressions 79 and 81 are directed toward the inner side of the cover part 7.2 such that the fingers of the user can be inserted into the depressions 79 and 81 from the outer side of the cover part 7.2. The cover part 7.2 can be held by pressing together the fingers against a web 83 formed between the depressions 79 and 81.

The cover part 7.2 of the cover device 1.2 according to FIGS. 7 and 8 can also be distinguished from the cover part 7 of the cover device 1 in that additional snap-on elements 41 and 43, as well as additional snap-on counterelements 49 and 51 corresponding thereto, are provided besides the snap-on elements 37 and 39. The snap-on elements 37 and 39 and the additional snap-on elements 41 and 43 respectively engage with the associated snap-on counterelement 45 or 47 or 49 or 51 during the movement of the cover part 7.2 from the intermediate installation position P1 into the final installation position P2 such that the cover part 7.2 is in the final installation position P2 secured against separating from the frame 5.2 in the direction extending transverse to the covering surface 53 of the cover part 7.2.

The snap-on elements 41 and 43 are preferably arranged on opposite side regions of the cover part 7.2. For example, the snap-on elements 37 and 41, as well as the snap-on elements 39 and 43, are respectively arranged behind one another in a row viewed in the inserting direction of the cover part 7.2. Accordingly, the additional snap-on counterelements 49 and 51 are preferably arranged opposite of the snap-on counterelements 45 and 47. The additional snap-on elements 41 and 43 and the additional snap-on counterelements 49 and 51 may be realized identically to the snap-on elements 37 and 39 and the snap-on counterelements 45 and 47. However, the additional snap-on elements 41 and 43, as well as the additional snap-on counterelements 49 and 51, may also have a different design than the snap-on elements 37 and 39 and the snap-on counterelements 45 and 47.

The cover part 7.2 of the cover device 1.2 can also be distinguished from the cover part 7 of the cover device 1, among other things, in that at least one forwardly extending projection 85, preferably two such projections, are provided on the front end region 55 of the cover part 7.2, wherein the cover part 7.2 is in the end region 55 secured against a lateral displacement relative to the frame 5.2 by means of said projections. For example, the projections 85 are realized plane and have the shape of a tooth. The frame 5.2 is realized accordingly in this corresponding region. Due to the projections 85, the cover part 7.2 is in the end region 55 secured against a lateral displacement relative to the frame 5.2 in the final installation position P2 of the cover part 7.2, in which the projections 85 are inserted into the corresponding receptacle 57 on the frame 5.2.

Figure 9:
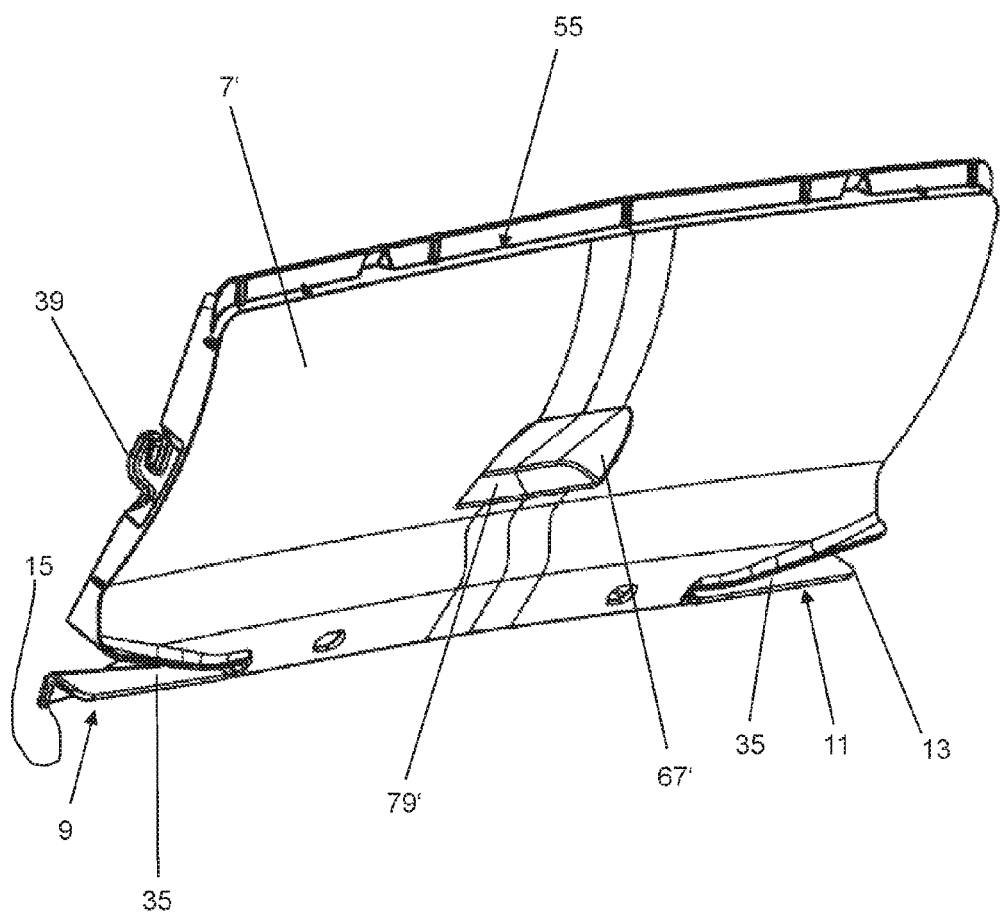
FIG. 9 shows the cover part of the cover device according to FIG. 7 in the form of a perspective bottom view.

FIG. 9 shows an example of a cover part 7' that essentially corresponds to the cover part 7 of the cover device 1 according to FIGS. 1-6. The cover part 7' can be distinguished from the cover part 7 according to FIGS. 1-6, for example, in that at least one depression 79' is provided as manipulating element 67 instead of the through-opening 69, wherein said depression can be taken hold of by a user with the hands in order to hold and actuate the cover part 7' on the frame 5 of the cover device 1.

Figure 10:
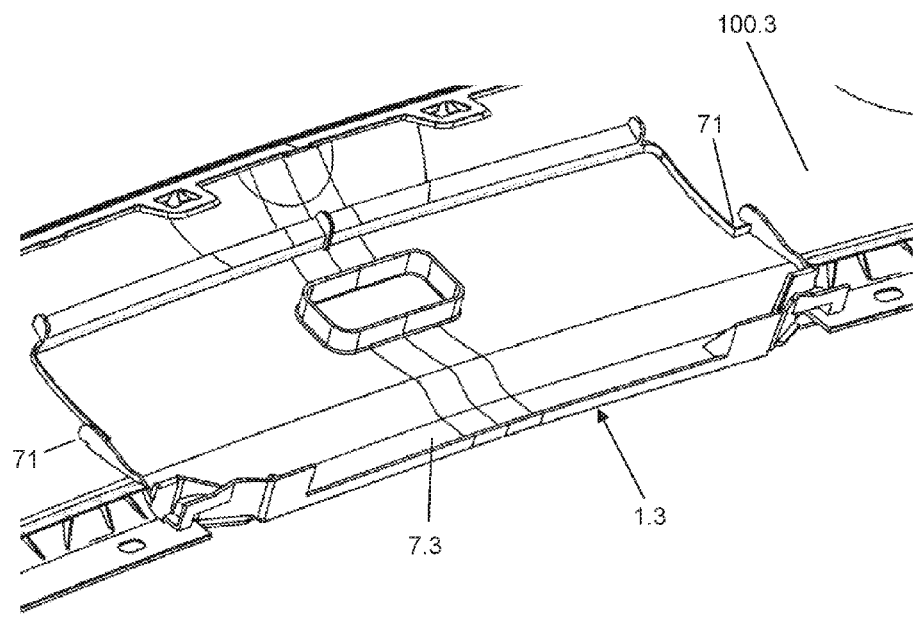
FIG. 10 shows a third embodiment of a cover device that is installed on a bumper for a motor vehicle in the form of a perspective detail.

FIGS. 10-13 show a third exemplary embodiment of a cover device 1.3 for covering an opening in a bumper for a motor vehicle, which can be used as a passage for a detachable trailer hitch component or another attachment. In FIG. 10, the cover device 1.3 is already installed on a bumper 100.3.

The cover device 1.3 according to FIGS. 10-13 can be distinguished from the cover device 1 according to FIGS. 1-6, among other things, in that a frame 5.3 is provided, the opening 3.3 of which can be covered by means of a cover part 7.3, wherein the frame 5.3 is formed by the bumper 100.3 itself. A separate frame element of the type provided, for example, in the cover device 1 according to FIGS. 1-6 is therefore eliminated in this embodiment of the cover device 1.3.

Figure 11:
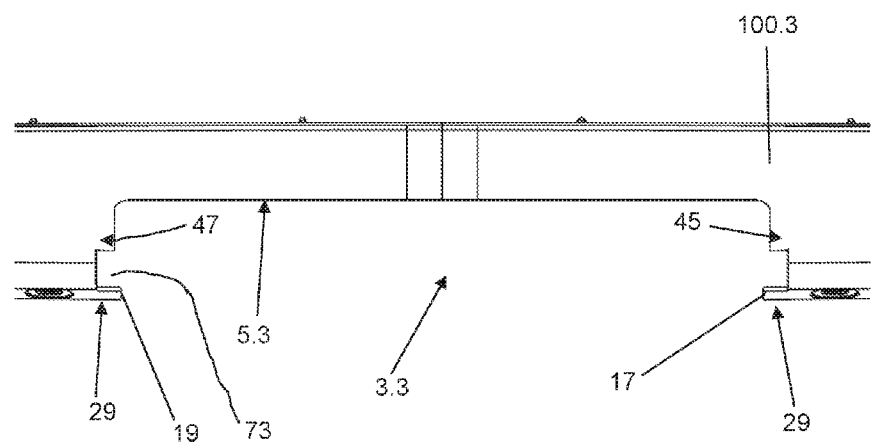
FIG. 11 shows a detail of the bumper according to FIG. 10 in the region of an opening for the cover device in the form of a bottom view.
Figure 12:
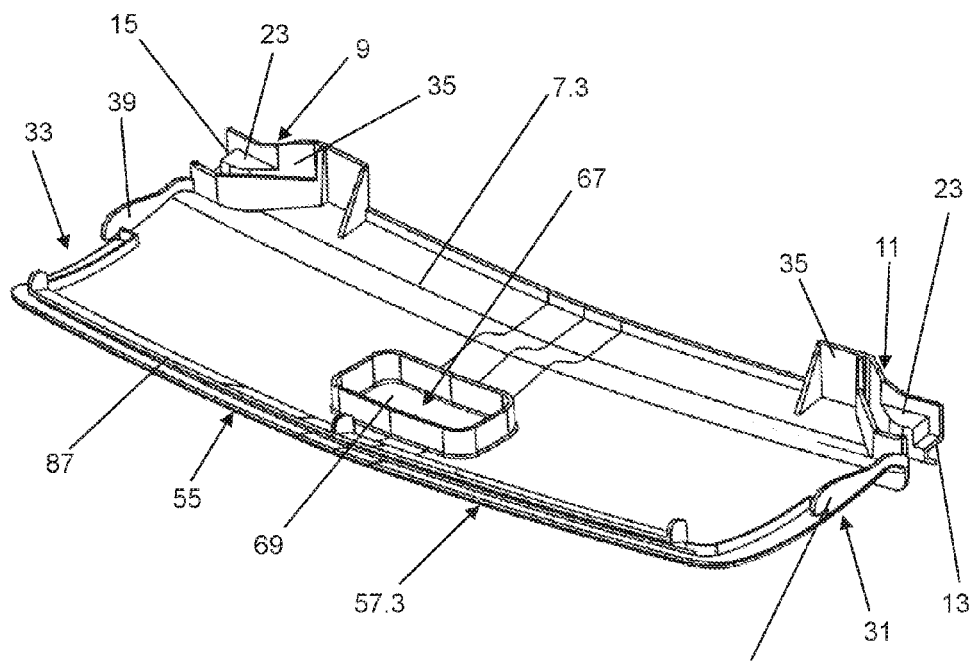
FIG. 12 shows the cover part of the cover device according to FIG. 10 in the form of a perspective view.

FIG. 11 shows the bumper 100.3 in the region of its frame 5.3. According to this figure, the counter-bearing surfaces 17 and 19, which were already described above with reference to the cover part 1 according to FIGS. 1-6, are respectively formed or molded directly on the bumper 100.3 in the cover device 1.3, wherein the inwardly directed projection 29 may in the embodiment according to FIG. 11 also be realized directly on the bumper 100.3, on which the counter-bearing surfaces 17 and 19 are located.

Figure 13:
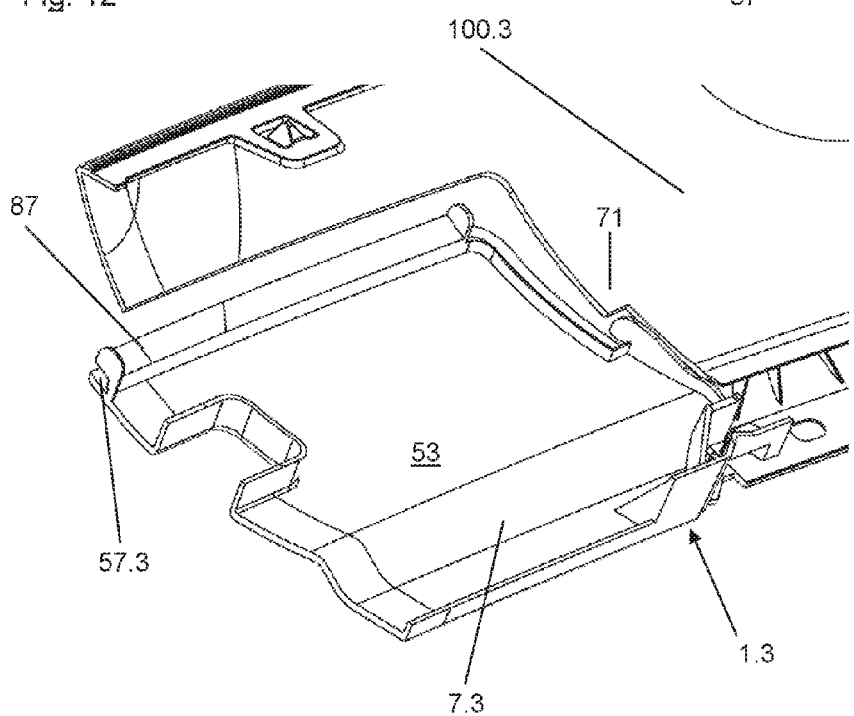
FIG. 13 shows the cover device according to FIG. 10 in the form of a perspective detail, in which the cover part is in an intermediate installation state on the bumper.

The snap-on counterelements 45 and 47 provided on the frame 5 of the cover device 1 and the interruptions 73 are in the cover device 1.3 also realized directly on the bumper 100.3 as illustrated, in particular, in FIGS. 11 and 13.

The cover device 1.3 according to FIGS. 10-13 can also be distinguished from the cover device 1 according to FIGS. 1-6, among other things, in that a projection 87, which originates on the inner side of the cover part 7.3, is realized on the front end region 55 of the cover part 7.3 and forms a receptacle 57.3 together with the front end of the cover part 7.3. During the movement of the cover part 7.3 from its intermediate installation position P1 into its final installation position P2, the receptacle 57.3 respectively engages with the periphery of the opening 3.3 of the frame 5.3 or the bumper 100.3 such that the cover part 7.3 is secured against separating from the frame 5.3 in the direction extending transverse to the covering surface 53 of the cover part 7.3.

FIG. 13 elucidates the interaction between the cover part 7.3 and the frame 5.3 formed by the bumper 100.3 in that the cover part 7.3 is in this figure illustrated in a position, in which the cover part 7.3 is already coupled to the frame 5.3, but its snap-on elements 37 and 39, as well as its receptacle 57.3, are not yet engaged with the frame 5.3.

FIG. 14 shows a fourth exemplary embodiment of a cover device 1.4 for covering an opening in a bumper for a motor vehicle, which can be used as a passage for a detachable trailer hitch component or another attachment.

Components and functional elements of the cover device 1.4 according to FIGS. 14-17, which are identical or functionally identical to components and functional elements of the cover device 1 according to FIGS. 1-6, are identified by the same reference symbols; in this respect, we refer to the description of the cover device 1 with reference to FIGS. 1-6.

The cover device 1.4 according to FIGS. 14-17 can be distinguished from the cover device 1 according to FIGS. 1-6, among other things, in that a frame 5.4 and a cover part 7.4 covering the opening 3 of the frame 5.4 are provided, wherein at least one spring element, preferably two spring elements 9.4 and 11.4, are provided on the frame 5.4. The respective spring elements 9.4 and 11.4 are preferably formed by an elastic material section 35.4 of the frame 5.4. The spring elements 9.4 and 11.4 are preferably arranged in the region of the frame 5.4 that in the final installation position P2 effectively contacts the front end region 55 of the cover part 7.4. For this purpose, corresponding outwardly extending projections 89, if applicable, with a guide bevel may be provided on the cover part 7.4 and effectively contact the spring elements 9.4 and 11.4, particularly in the form of a clamping contact, during the movement of the cover part 7.4 into the final installation position P2. The restoring force of the spring elements 9.4 and 11.4 is generated due to the sliding movement along the guide bevel.

In the cover device 1.4, the installation of the cover part 7.4 on the frame 5.4 is carried out as follows: the bearing surfaces 13 and 15 of the cover part 7.4 are coupled to the counter-bearing surfaces 17 and 19 of the frame 5.4 such that the pivot bearing 21 is formed. The coupled cover part 7.4 is then pivoted in the direction toward the frame 5.4 such that the spring elements 9.4 and 11.4 are moved by the projections 89 and a spring force is simultaneously generated. The pivoting movement takes place until the front end region 55 of the cover part 7.4 contacts the frame 5.4, particularly the contact surface 65. The restoring force of the spring elements 9.4 and 11.4 generated at this point results in such a high clamping force relative to the projections 89 that the cover part 7.4 is held in this final installation position by the clamping force of the spring elements 9.4 and 11.4.

FIG. 15 shows the cover part 7.4. According to this figure, the cover part 7.4 is provided with a manipulating element 67.4 for the manual installation of the cover part 7.4, which is formed by a depression from the outer side of the cover part 7.4.

FIG. 16 shows the frame 5.4. FIG. 17 shows the bumper 100 in the region of its through-opening 110 that can be used as a passage for the trailer hitch or the other attachment and on which the frame 5.4 of the cover device 1.4 is mounted.

Figure 18:
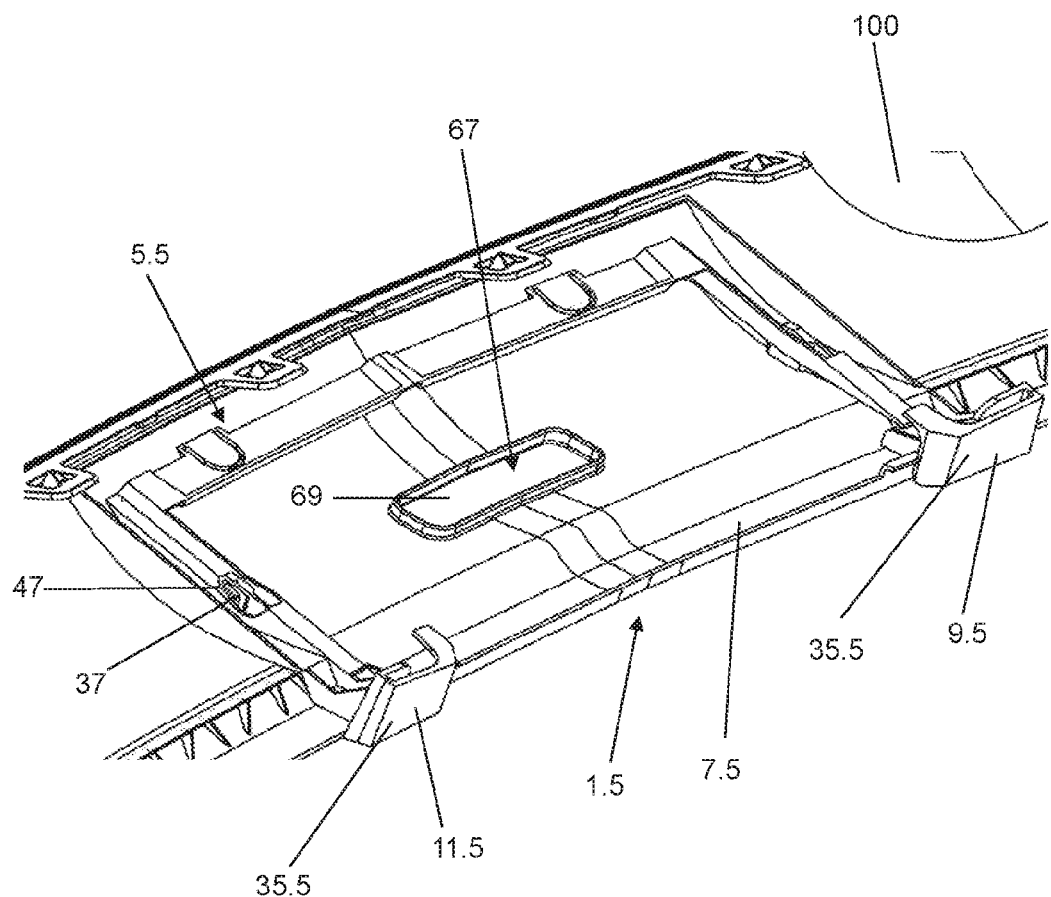
FIG. 18 shows a fifth embodiment of a cover device that is installed on a bumper for a motor vehicle in the form of a perspective view.
Figure 19:
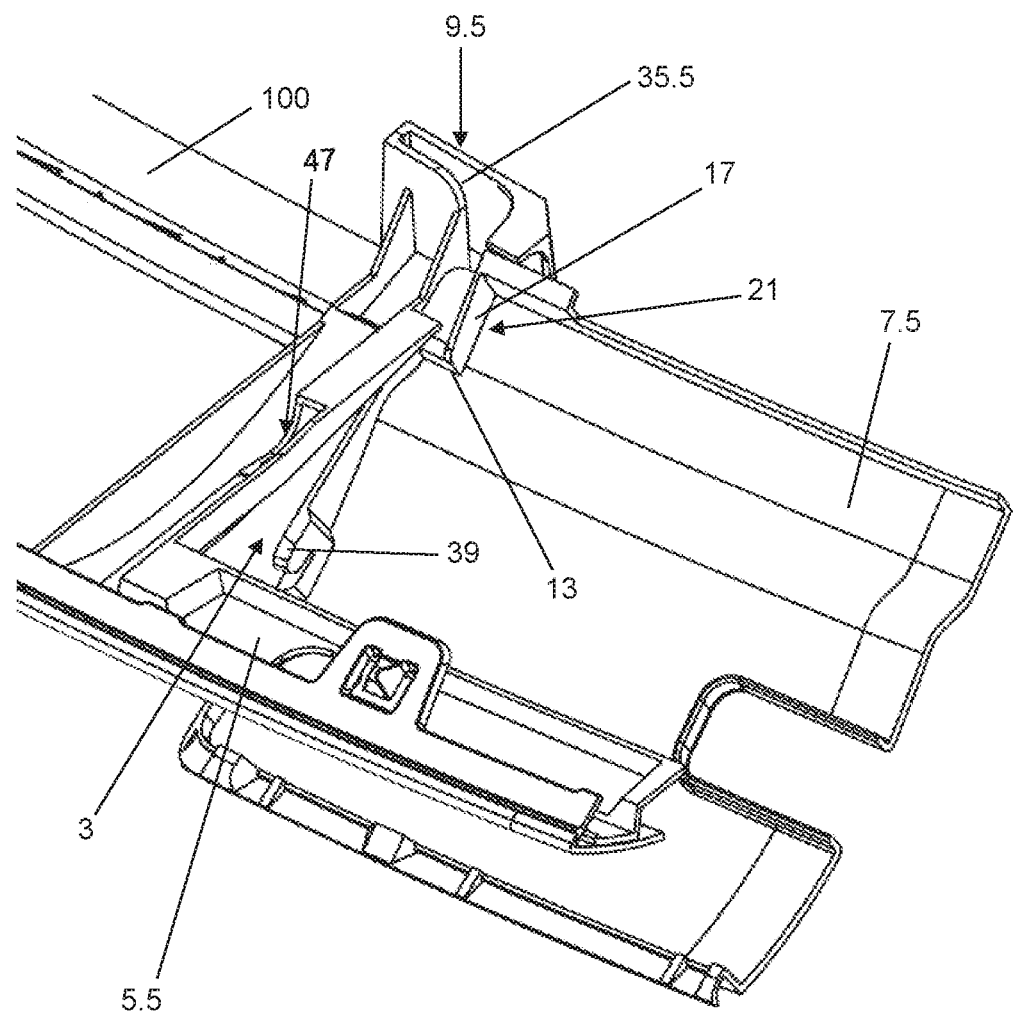
FIG. 19 shows the cover device according to FIG. 18, wherein the cover part of the cover device is in an intermediate installation position.

FIGS. 18 and 19 show a fifth embodiment of a cover device 1.5 for covering an opening in a bumper for a motor vehicle, which can be used as a passage for a detachable trailer hitch component or another attachment. In FIGS. 18 and 19, the respective cover device 1.5 is already installed on the above-described bumper 100.

Components and functional elements of the cover device 1.5, which are identical or functionally identical to components and functional elements of the cover device 1 according to FIGS. 1-6, are identified by the same reference symbols; in this respect, we refer to the description of the cover device 1 with reference to FIGS. 1-6.

The cover device 1.5 features a frame 5.5, the opening 3 of which can be covered by means of a cover part 7.5, wherein the cover part 7.5 can be installed on the frame 5.5 in such a way that the cover part 7.5 is moved from the initial position, which was already described above with reference to the cover device 1, into the intermediate installation position, which also was already described above with reference to the cover device 1, against the force of at least one spring element, preferably two spring elements 9.5 and 11.5, and a movement of the cover part 7.5 into the final installation position, which likewise was already described above with reference to the cover device 1, is subsequently promoted by the force of the spring elements 9.5 and 11.5 or caused by the force of the spring elements 9.5 and 11.5.

The cover device 1.5 according to FIGS. 18 and 19 can be distinguished from the cover device 1 according to FIGS. 1-6, among other things, in that the spring elements 9.5 and 11.5 are arranged, particularly formed, on the frame 5.5 in the cover device 1.5. For example, the spring elements 9.5 and 11.5 are respectively formed by an elastic or elastically movable material section 35.5 that is integrally molded or formed on the frame 5.5.

FIG. 19, in particular, shows that the frame 5.5 features the counter-bearing surface 17 for being coupled to the bearing surface 13 of the cover part 7.5 on a material section of the frame 5.5. This material section may be realized relatively rigid, particularly such that it is not elastically movable. The spring elements 9.5 and 11.5 act upon the cover part 7.5 in the region of the coupling or the pivot bearing 21. For example, the spring elements 9.5 and 11.5 are arranged, particularly formed, in the region of the open ends of the frame 5.5.

FIG. 20 shows a sixth embodiment of a cover device 1.6 for covering an opening in a bumper for a motor vehicle, which can be used as a passage for a detachable trailer hitch component. This embodiment of the cover device 1.6 is a combination of the cover device 1.1 according to FIG. 1-6 and the cover device 1.3 according to FIGS. 10-13.

Figure 22:
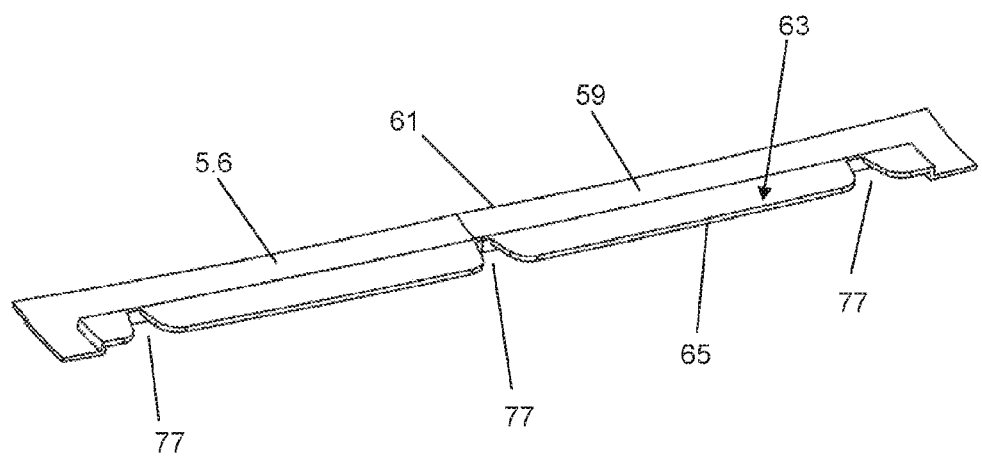
FIG. 22 shows a frame part of the cover device according to FIG. 20 in the form of a perspective view.
Figure 23:
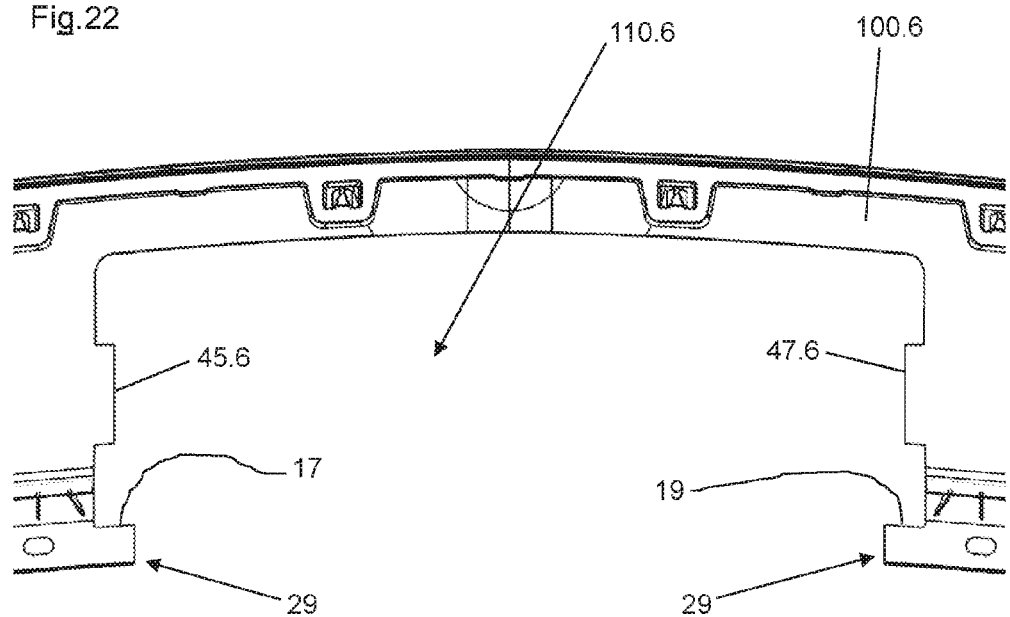
FIG. 23 shows a detail of the bumper according to FIG. 20 in the region of an opening for the cover device according to FIG. 20 in the form of a top view.

The cover device 1.6 features a frame that is formed by a separate frame part 5.6 in combination with the periphery of the opening 110 in the bumper 100.6. FIG. 22 shows the frame part 5.6. FIG. 23 shows the bumper 100.6 in the region of its through-opening 110.6.

The frame part 5.6 can be mounted on the bumper 100.6 on a peripheral region of the opening 110.6 that in the installed state of a corresponding cover part 7.6 of the cover device 1.6 engages with the front end region 55 of the cover part 7.6 as illustrated, for example, in FIG. 20. FIG. 21 shows the cover part 7.6.

FIG. 22, in particular, shows that the frame part 5.6 is realized in the form of an elongated profile, on which one surface section forms the periphery 59 for being mounted on the bumper 106 with its contact surface 61 and another section of the periphery 63 forms the contact surface 65 that is contacted by the cover part 7.6.

In this embodiment, the counter-bearing surfaces 17 and 19 on the periphery of the opening 110.6 and the bumper 106 are realized on the inwardly protruding projections 29 that are coupled to the bearing surfaces 13 and 15 of the cover part 7.6 in order to form the pivot bearing 21.

Snap-on elements 37.6 and 39.6 are furthermore formed, particularly molded, on the periphery of the opening 110.6 of the bumper 106 and engage with snap-on counterelements 45.6 and 47.6 of the cover part 7.6 when the cover part 7.6 is installed on the frame of the cover device 1.6. The snap-on connection then secures the cover part 7.6 against separating from the frame in the direction extending transverse to the covering surface 53 of the cover part 7.6.

The snap-on counterelements 45.6 and 47.6 are preferably formed on longitudinal sections of the periphery of the opening 110.6, for example, in such a way that the snap-on counterelements 45.6 and 47.6 can move into corresponding interruptions 73.6 or recesses on the cover part 7.6 during the installation of the cover part 7.6 and engage with the snap-on elements 37.6 and 39.6 due to the spring force of the spring elements 9 and 11 during the course of the displacement of the cover part 7.6 into the final installation position P2. The snap-on elements 37.6 and 39.6 may be respectively formed by material sections of the cover part 7.6.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A cover device for a bumper of a motor vehicle comprising:

a frame that forms an opening, the opening configured as a passage for a detachable trailer hitch component or another attachment; and a cover part that is configured to attach to the frame to cover the opening of the frame, the cover part including at least one spring element with a bearing surface;

wherein the cover part has an initial position, an intermediate installation position (P1), and a final installation position (P2) relative to the frame;

wherein, in the initial position, the bearing surface of the at least one spring element bears against the frame to form a pivot bearing;

wherein the cover part is configured to pivot about the pivot bearing from the initial position into the intermediate installation position (P1) against the force of the at least one spring element; and wherein the at least one spring element is configured to bias the cover part from the intermediate installation position (P1) toward the final installation position (P2), in which the opening of the frame is covered by the cover part.

2. The cover device according to claim 1, wherein the cover part is held in the final installation position (P2) by the force of the spring element.

3. The cover device according to claim 1, wherein the cover part is configured to be received in a receptacle defined at least partly by the frame adjacent an inner periphery of the frame, the receptacle being arranged toward the opening.

4. The cover device according to claim 1, wherein the spring element is formed by a material section that can be elastically moved at least in the direction of the movement of the cover part from the intermediate installation position (P1) into the final installation position (P2).

5. The cover device according to claim 1, wherein the cover part includes a snap-on element, and wherein the frame includes an interruption in a wall section;

wherein, as the cover part moves from the initial position toward the intermediate installation position (P1), the snap-on element is received within the interruption; and wherein, as the cover part moves from the intermediate installation position (P1) to the final installation position (P2), the snap-on element receives the wall section to secure the cover part in the final installation position (P2).

6. The cover device according to claim 1, wherein the frame includes a receptacle;

wherein the cover part includes a front end region on a side that opposes the pivot bearing: and wherein, as the cover part moves from the intermediate installation position (P1) to the final installation position (P2), the front end region is received in the receptacle to secure the cover part in the final installation position (P2).

7. The cover device according to claim 1, wherein at least one snap-on element is provided and engages with a snap-on counterelement during the movement of the cover part from the intermediate installation position (P1) into the final installation position (P2) such that the cover part is in the final installation position (P2) secured against separating from the frame at least in the direction extending transverse to the covering surface of the cover part.

8. A cover device for a bumper of a motor vehicle comprising:

a frame that forms an opening the opening configured as a passage for a detachable trailer hitch component or another attachment; and a cover part that is configured to attach to the frame to cover the opening of the frame, the cover part including at least one spring element with a bearing surface;

wherein the cover part has an initial position, an intermediate installation position (p1), and a final installation position (P2) relative to the frame;

wherein, in the initial position, the bearing surface is coupled to a counter-bearing surface of the frame such that a pivot bearing is formed;

wherein the cover part is configured to pivot about the pivot bearing from the initial position into the intermediate installation position (P1); against the force of the spring element; and wherein the spring element is configured to bias the cover part from the intermediate installation position (P1) toward the final installation position (P2); and wherein the spring element is configured to hold the cover part in the final installation position (P2) by the force of the spring element.

9. The cover device according to claim 8, wherein the cover part features a manipulating element formed by a through-opening or depression that is as wide as a finger or by at least two depressions that can be taken hold of with fingers.

10. The cover device according to claim 8, wherein the frame is at least partially formed by the periphery of an opening in the bumper for a motor vehicle.

\* \* \* \* \*